United States Patent [19]

Vermaas et al.

[11] Patent Number: 5,397,592
[45] Date of Patent: Mar. 14, 1995

US005397592A

[54] ANTI-SPATTERING AGENT AND SPREADS COMPRISING THE SAME

[75] Inventors: Leo F. Vermaas, Maassluis; Jan Benjamins; Peter Sonneveld, both of Vlaardingen, all of Netherlands

[73] Assignee: Van Den Bergh Foods Co., Division of Conopco Inc., Lisle, Ill.

[21] Appl. No.: 941,015

[22] Filed: Sep. 2, 1992

[30] Foreign Application Priority Data

Sep. 6, 1991 [GB] United Kingdom ............... 9119149

[51] Int. Cl.$^6$ ............................................... A23D 7/02
[52] U.S. Cl. ................................. 426/604; 426/605; 426/662
[58] Field of Search ................. 426/438, 604, 605, 662

[56] References Cited

U.S. PATENT DOCUMENTS

| | | | |
|---|---|---|---|
| 4,325,980 | 4/1982 | Rek | 426/604 |
| 4,524,085 | 6/1985 | Purves | 426/662 |
| 4,528,201 | 7/1985 | Purves | 426/662 |
| 4,608,264 | 8/1986 | Fan | 426/438 |
| 4,985,272 | 1/1991 | Grootscholten | 426/604 |
| 5,079,028 | 1/1992 | Wieske | 426/604 |
| 5,120,561 | 6/1992 | Silva | 426/662 |

FOREIGN PATENT DOCUMENTS

0265003 4/1988 European Pat. Off. .
0377239 7/1990 European Pat. Off. .

OTHER PUBLICATIONS

Flack, "The contribution of emulsifying agents to modern food production", Food Science and Technology Today, vol. 1, No. 4, 1987, pp. 240–243.
Hansen et al, "Short-term Feeding Study of the Emulsifier Homodan MO in Pigs", Fd Cosmet. Toxicol., Pergamon Press 1968, vol. 6, pp. 163–169.

*Primary Examiner*—Carolyn Paden
*Attorney, Agent, or Firm*—Cushman Darby & Cushman

[57] ABSTRACT

It is known to add anti-spattering agents to spreads and other frying fats so as to reduce the spattering tendency. Anti-spattering agents include, nitrogen, salt, calcium chloride or phosphates, and emulsifiers such as egg yolk and lecithin. Oxidised bean oil is known to be effective against primary spattering but ineffective against secondary spattering. An improved anti-spattering agent effective against both primary and secondary spattering, comprises a mixture of a thermally oxidised vegetable oil such as "blown bean oil" and a source of phosphatidyl choline, preferably "Cetinol".

12 Claims, No Drawings

ANTI-SPATTERING AGENT AND SPREADS COMPRISING THE SAME

The present invention relates to an anti-spattering agent for use in edible spreads and other frying fats, particularly in spreads having a reduced fat content.

BACKGROUND OF THE INVENTION

Edible spreads such as margarine are often used for shallow frying purposes. Margarine, like butter, contains around 80% fat and 20% of a water phase. In recent years, consumer concern with health has led to the increased use of reduced fat spreads comprising around 60% fat and 40% of an aqueous phase. This doubling or in some cases further increase in water content leads to "spattering" problems when such spreads are used for shallow frying.

Spattering problems can be minor in that some hot fat is ejected from the frying pan causing inconvenience and soiling of work-surfaces or spattering problems can be major, in that "catastrophic spattering events" occur leading to ejection of large quantities of hot fat. Spattering problems may also occur with deep frying fats. Spattering is a long-standing technical problem upon which a great deal of effort has been expended. Many contradictory results have been obtained, for example smooth enamelled pans give more spattering than would be expected and relatively cool pans give more spattering than would be expected. In the face of these results it has proved difficult to predict spattering behaviour of spreads.

It is convenient to differentiate between two types of spattering under experimental conditions. So-called "primary" spattering occurs when a portion of spread is heated to drive off the water-phase. This heating step is a necessary preliminary to shallow frying with water containing spreads such as margarine and 60% fat spreads. "Secondary" spattering occurs when water is added to hot fat. Such addition is difficult to avoid when food articles are placed in fat for deep or shallow frying. It is important that both forms of spattering are reduced.

It is known to add anti-spattering agents to spreads and other frying fats so as to reduce the spattering tendency. Anti-spattering agents include, nitrogen, salt, calcium chloride or phosphates, and emulsifiers such as egg yolk and lecithin. Antagonistic effects have been noted between anti-spattering agents such that the combination of two known anti-spattering agents may increase spattering above the expected level. It has also been found that while some anti-spattering agents are excellent in reducing primary spattering they actually increase the extent of secondary spattering.

SUMMARY OF THE INVENTION

We have now determined that an improved anti-spattering agent effective against both primary and secondary spattering, comprises a mixture of an oxidised vegetable oil preferably "blown bean oil." and a source of phosphatides, in particular phosphatidyl choline, preferably "Cetinol" (TM).

"Blown bean oil" is soya bean oil which has been subjected to at least partial oxidation and "Cetinol"(TM) comprises a mixture of phosphatidyl choline (PC) and phosphatidyl ethanolamine (PE) with a PC/PE usually greater than 2 and preferably greater than 3.

Blown bean oil is not in itself effective as a anti-spattering agent as regards secondary spattering, but is known as an emulsifier in spread manufacture and known to have some effect on primary spattering. Blown bean oil can be prepared by blowing air through heated soybean oil. Cetinol is known and used as an anti-spattering agent.

Accordingly, one aspect of the present invention provides edible fatty compositions, comprising a major fatty component, at least 0.05 wt. % and preferably at least 0.09 wt. % thermally oxidised vegetable oil, at least 0.25% preferably at least 0.5 and in particular at least 0.7% salt and at least 0.06 wt. % phosphatides, wherein the phosphatidyl choline: ethanolamine ratio is $>2$.

Such fatty compositions can comprise a water phase or may be substantially water free. Preferably, the compositions are edible emulsion spreads having a continuous fat phase and a dispersed water phase. All percentages are wt. % and have reference to total product unless the context demands otherwise.

Accordingly a second aspect of the present invention subsists in the use of an effective amount of thermally oxidised vegetable oil in combination with at least 0.25, preferably at least 0.5 and in particular at least 0.7 wt. % salt and an effective amount of a phosphatide mixture having a phosphatidyl choline: ethanolamine ratio $>2$ as an anti-spattering agent for edible spreads.

PREFERRED EMBODIMENTS OF THE INVENTION

The preferred use of the composition is in edible spreads having a reduced fat content as compared with margarines. That is, in spreads comprising less than 85 wt. % fat. Particularly useful spreads can be prepared with a fat content of 50–70 wt. %, preferably around 60 wt. %. It is believed that compositions according to the present invention not only have excellent primary spattering behaviour but also have acceptable secondary spattering behaviour. In such spreads it is commonplace to add saturated mono- and di-glycerides as emulsifiers to prevent separation of the aqueous and fatty phases.

A third aspect of the present invention subsists in an anti-spattering agent for edible emulsion spreads which comprises thermally oxidised vegetable oil and a phosphatide-containing, alcohol-extracted fraction of lecithin in a ratio of 1:10–10:1, wherein the phosphatides of the alcohol-extracted fraction have a phosphatidyl choline: ethanolamine ratio $>2$.

It should be noted that salt is a commonplace component of edible spreads and need not be present in the anti-spattering composition when such a composition is made and sold separately.

A further aspect of the present invention subsists in those fatty compositions comprising a water-in-oil emulsion, salt, thermally oxidized vegetable oil and an alcohol-extracted fraction of lecithin wherein the extent of primary and secondary spattering is such that in both primary and secondary spattering tests as defined herein a value of at least seven and five respectively is attained.

Preferably, the phosphatidyl choline (PC) is provided as CETINOL(TM) and therefore while some phosphatidyl ethanolamine (PE) will be present the ratio of PC:PE will be greater than 4:1.

According to a preferred embodiment of the invention there is provided an edible water-in-oil emulsion spread comprising 0.05–2 wt. % thermally oxidised bean oil, 0.3–1 wt. % CETINOL(TM) and 0.25–3% salt.

In a particularly preferred embodiment of the invention the anti-spattering components of the spread comprise:
a) 0.07–0.13 wt. % thermally oxidised vegetable and in particular bean oil,
b) 0.25≅0.50 wt. % phosphatide-containing, alcohol-extracted fraction of lecithin, wherein the phosphatides of the alcohol-extracted fraction have a phosphatidyl choline:ethanolamine ratio in the range 2–5, and,
c) 0.25–3% salt.

Typically, the spread comprises from 50–70% of a fatty phase and 50–30% of a aqueous phase dispersed therein. Such spreads, comprising around 60% fat can be used for shallow frying, baking and spreading purposes.

Analysis of Homodan MO, (TM) a commercially available 'blow bean oil' reveals it to be a complex mixture of mono-, di and tri-glycerol esters of edible fatty acids not more than 10% of which are derived from thermally oxidised and hydroxylated fatty acids of refined soy bean oil. The minimum quantity of 0.05% wt thermally oxidised bean oil mentioned above relates to the thermally oxidised and or otherwise thermally modified fraction of the commercial mixture.

The composition of the fatty phase preferably comprises one or more vegetable oils, preferably sunflower oil, soybean oil, rapeseed oil, peanut/groundnut oil and the like, together with a suitable hard fat component as a hardstock.

A preferred composition for a spread according to the present invention is:
a) 0.05–2.00 wt. % thermally oxidised vegetable oil,
b) 0.1–1.00 wt. % phosphatide-containing, alcohol-extracted fraction of lecithin, wherein the Phosphatides of the alcohol-extracted fraction have a phosphatidyl choline:ethanolamine ratio >2,
c) 0.25–3.00 wt. % salt,
d) 50.0–70.0 wt. % fat phase, and,
e) 30.0–50.0 wt. % aqueous phase.

Other components conventionally used in spreads can be present, such non-essential components include: milk or vegetable proteins (for example as skimmed-milk powder), flavour components, colouring agents, vitamins and/or preservatives (for example potassium sorbate).

EXAMPLES

In order to illustrate the advantages of the present invention a number of 60% spreads were prepared. The composition of these spreads is given in table 1 below. All products contained 38–40 wt. % water, 58–60 wt. % fat, 0.1 wt. % potassium sorbate (as a preservative) and 0.3% skim-milk powder (a common component of spreads). Other components are identified as follows:

SM: Saturated mono/diglyceride,
PG: Blown bean oil (Palsgaard 4004(TM)),
HD: Blown bean oil/mono diglycerides (1:10) (Homodan MO),
BZ: "Bolec ZTD" (TM); a refined and deodorized native soya lecithin product
CM: "Bolec CM" (TM); a lyso cetinine product, originating from soya oil
CT: Cetinol(TM)
ST: Sodium Chloride.

All the compositions prepared as examples comprised 0.2% wt saturated mono/diglyceride as an emulsifier to obtain emulsion stability. Such compositions are available in the marketplace.

According to WHO Food Add. Ser. No 2 (1972) pages 41–42; blown bean oil can be prepared by oxidation of soy bean oil with air under a pressure of 250 mm Hg at a temperature of 190°–200° C., until the iodine value has decreased to 75–85 and a hydroxyl value of about 60 is attained. The oxidised product is deodorised with superheated steam at 180°–185° C. under 5 mm Hg and then partly interesterified with a mixture of mono-, di- and triglycerides in vacuo. The final product is not allowed to come into contact with air until it has cooled to a temperature below 80° C.

A mixture of components comprising around 10% thermally oxidised (blown) bean oil is available from the Grindsted company of Denmark as 'HOMODAN MO'. The product is described in promotional literature as a "thermally oxidized soya bean oil interacted with mono- and diglycerides of fatty acids." In this same promotional literature, the suggested application of HOMODAN MO is "for use in frying margarine containing milk and approximately 1% salt". The properties of HOMODAN MO listed in the literature include "minimal spattering" and it is suggested that usage should be at a 0.3% level with 0.1–0.3% soya lecithin present.

As essentially pure thermally oxidised bean oil is available from the Palsgaard Company as 'Palsgaard 4004'.

CETINOL is prepared by fractionation of soybean lecithin (65% phosphatides) in ethanol. The lecithin is mixed in a ratio of 1:3 with 90–95% ethanol at about 25° C. The upper layer with 7–8% phosphatides in ethanol is decanted, centrifuged and concentrated to 30% at a temperature below 90° C. and under reduced pressure. Groundnut oil is added and the solvent stripped in a Kontro (RTM) thin film evaporator at a temperature of up to 110°–115° C. under reduced pressure. 5% of monoglycerides of sunflower are added to improve pumpability and stop separation. 100 kg of lecithin gives 15 kg of alcohol soluble fraction known as "CETINOL" and enriched in phosphatidyl choline. CETINOL and similar compositions are available in the marketplace. One such composition is sold as "BOLEC-F" by Quest Chemicals.

A typical analysis of such an alcohol soluble fraction is given below:

| Cetinol (red-yellow viscous liquid) | |
| --- | --- |
| Oil plus monoglyceride | 66.9% |
| FFA in oil | 2.8% |
| Water | 0.4% |
| Phosphorous | 1.0% |
| Phosphatidylcholine (PC) | 15.5% |
| Phosphatidylethanolamine (PE) | 3.5% |

It can be seen that the PC to PE ratio is in excess of 4 (4.43 in this case). In normal soybean lecithin the ratio of PE to PC is close to 1:1.

The spreads were prepared by a conventional process in which a premix was prepared from a fat phase and an aqueous phase at elevated temperature. Emulsifier components were introduced into the molten fat phase. This premix was cooled to a temperature of below 25 degrees Centigrade and worked in a series of scraped surface heat exchangers (A-units) and pin-stirrers (C-units), to obtain a fat continuous plastified emulsion by a conventional process.

Primary spattering (PS) was assessed under standardised conditions in which an aliquot of spread was heated in a glass dish and the amount of fat spattered onto a sheet of paper held above the dish was assessed after the water content of the spread had been driven off by heating.

Secondary spattering (SS) was assessed under standardised conditions in which the amount of fat spattered onto a sheet of paper held above a dish is assessed after injection of a quantity of 10 ml water into the dish.

In the assessment of both primary and secondary spattering, a glass dish at a temperature of 205 degrees Centigrade was employed, and the paper was fixed 25 cm above the dish. 25 g samples of the spreads were used in the tests.

In assessing both types of spattering the a scale was used which related the extent of spattering to a standard set of photographic patterns forming a scale ranging from 0 (very much spattering) to 10 (no spattering). The overall spattering behaviour of the products are generally related to the scale as follows:

| score | comments |
|-------|----------|
| 10 | excellent |
| 8 | good |
| 6 | passable |
| 4 | unsatisfactory |
| 2 | very poor |

Typical results for household margarines (80 wt. % fat) are 8.5 for primary spattering and 4.6 for secondary spattering under the conditions of the above-mentioned test. It is a desideratum to obtain a 60 wt. % fat product with similar spattering figures.

From the results presented in the table it can be seen that thermally oxidised (blown) bean oil is an excellent inhibitor of primary spattering in the absence of monoglycerides (comparative example 1: 0.5% wt BBO), but that the substitution of a mixture of mono- and di-glyceride with the oxidised component (comparative example 2: 0.09% wt BBO) drastically reduces the effectiveness of the anti-spattering effect as regards primary spattering. In both comparative example 1 and comparative example 2 it can be seen that the active principle in bean oil is only effective against primary spattering when the thermally oxidised component is present at relatively high levels.

Comparative examples 3–5 illustrate how far better spattering results are obtained by the use of lecithin in combination with salt. Such combinations are known and used in the production of spreads.

Comparative examples 6–7 and Example 8 illustrate the advantages of the present invention. It can be seen from a comparison of examples 2 and 5 and the embodiment 8 that the presence of blown bean oil (as in example 2) together with the lecithin extract 'Cetinol' (as in example 5) has an effect which cannot be predicted from the results of examples 2 and 5. The use of an alternative lecithin, (such as in comparative examples 6 and 7) illustrate how the beneficial effect is not attained with pure bean oil lecithin. The spattering figures obtained in Example 8 are seen to be comparable or better than those obtained with the margarine used as a control.

Examples 9–11 illustrate that the presence of salt is important. This can be seen by a comparison of embodiments 8 and 10: as the salt level is reduced the spattering behaviour becomes worse and this can only be partially compensated for by the addition of further Cetinol (as in example 11).

Example 12 illustrates how the product may be further improved by the addition of higher levels of blown bean oil in comparison to the embodiment of example 8. For organoleptic reasons the levels of blown bean oil should not exceed 5% wt on product.

Example 13 illustrates that the addition of CETINOL alone results in a worse spattering behaviour when compared to examples 12 and 8, although the total amount of saturated mono-diglycerides is kept constant.

Examples 14–17 illustrate the effectiveness of another type of blown bean oil, the effect of the salt content and the effect of the substitution of Cetinol by another bean oil lecithin product.

TABLE 1

SM: Saturated monoglyceride,
PG: Blown bean oil (Palsgaard 4004),
HD: Blown bean oil/mono diglycerides (1:10) (Homodan MO),
BZ: Bolec ZTD, a refined and deodorized native soya lecithin product,
CM: Bolec CM, a lyso cetinin product originating from soya oil,
CT: Cetinol,
ST: Sodium Chloride.

| Example | SM | PG | HD | BZ | CM | CT | ST | PS | SS |
|---------|-----|-----|-----|------|------|-----|-----|------|-----|
| 1 | 0.2 | 0.5 | — | — | — | — | 0.7 | 10 | 0 |
| 2 | 0.2 | — | 1.0 | — | — | — | 0.7 | 1 | 0.5 |
| 3 | 0.2 | — | — | 0.5 | — | — | 0.7 | 6.6 | 5.8 |
| 4 | 0.2 | — | — | 0.25 | 0.25 | — | 0.7 | 6.5 | 6.6 |
| 5 | 0.2 | — | — | — | — | 0.3 | 0.7 | 6.5 | 6.1 |
| 6 | 0.2 | — | 1.0 | 0.3 | — | — | 0.7 | 5.7 | 5.4 |
| 7 | 0.2 | — | 1.0 | — | 0.3 | — | 0.7 | 5.4 | 6.7 |
| 8 | 0.2 | — | 1.0 | — | — | 0.3 | 0.7 | 8.1 | 6.3 |
| 9 | 0.2 | — | 1.0 | — | — | 0.1 | 0.3 | 1.0 | 3.4 |
| 10 | 0.2 | — | 1.0 | — | — | 0.3 | 0.3 | 5.0 | 5.0 |
| 11 | 0.2 | — | 1.0 | — | — | 0.5 | 0.3 | 7.1 | 6.0 |
| 12 | 0.2 | — | 1.5 | — | — | 0.3 | 0.7 | 9.4 | 6.0 |
| 13 | 1.1 | — | — | — | — | 0.3 | 0.7 | 6.0 | 6.0 |
| 14 | 0.2 | 0.4 | — | 0.5 | — | — | 0.7 | 5.5 | 5.0 |
| 15 | 0.2 | 0.4 | — | — | — | 0.3 | 0.3 | 6.8 | 5.8 |
| 16 | 0.2 | 0.4 | — | — | — | 0.3 | 0.7 | 9.0 | 6.3 |
| 17 | 0.2 | 0.1 | — | — | — | 0.3 | 0.7 | 8.0 | 5.3 |

We claim:

1. An edible water-in-oil emulsion composition suitable for use in frying, comprising a major fatty component, and, for improved anti-spattering properties, at least 0.05 wt. % blown bean oil, at least 0.25% salt and at least 0.06 wt. % phosphatides, wherein the phosphatidyl choline:ethanolamine ratio is >2.

2. A composition according to claim 1, comprising at least 0.5% salt.

3. A method of improving the anti-spattering properties of an edible spread which comprises including in the spread an effective amount of blown bean oil in combination with at least 0.25 wt. % salt and an effective amount of phosphatide mixture having a phosphatidyl choline:ethanolamine ratio >2 as an anti-spattering agent for edible spreads.

4. Anti-spattering agent for edible emulsion spreads which comprises thermally oxidised vegetable oil and a phosphatide-containing, alcohol-extracted fraction of lecithin in a ratio of 1:10–10:1, wherein the phosphatides of the alcohol-extracted fraction have a phosphatidyl choline:ethanolamine ratio >2.

5. Fatty compositions comprising a water-in-oil emulsion, salt, thermally oxidized vegetable oil and an alcohol-extracted fraction of lecithin wherein the extent of primary and secondary spattering is such that in both primary or secondary spattering tests as defined herein a value of at least seven and five respectively is attained.

6. Edible water-in-oil emulsion spread comprising:
 a) 0.05–2 wt. % thermally oxidised vegetable oil,
 b) 0.1–1 wt. % phosphatide-containing, alcohol-extracted fraction of lecithin, wherein the phosphatides of the alcohol-extracted fraction have a phosphatidyl choline: ethanolamine ratio >2, and,
 c) salt.

7. Edible water-in-oil emulsion spread according to claim 6, comprising:
 a) 0.07–0.13 wt. % thermally oxidised vegetable oil,
 b) 0.25–0.50 wt. % phosphatide-containing, alcohol-extracted fraction of lecithin, wherein the phosphatides of the alcohol-extracted fraction have a phosphatidyl choline:ethanolamine ratio in the range 2–5, and,
 c) 0.25–3% salt.

8. Edible water in oil emulsion spread according to claim 6 comprising:
 a) 0.05–2.00 wt. % thermally oxidised vegetable oil,
 b) 0.1–1.00 wt. % phosphatide-containing, alcohol-extracted fraction of lecithin, wherein the phosphatides of the alcohol-extracted fraction have a phosphatidyl choline:ethanolamine ratio >2,
 c) 0.25–3.00 wt. % salt,
 d) 50.0–70.0 wt. % fat phase, and,
 e) 30.0–50.0 wt. % aqueous phase.

9. Anti-spattering additive for fatty compositions comprising
 a) 7–13 parts by weight of thermally oxidized vegetable oil
 b) 25–50 parts by weight of phosphatide containing, alcohol extracted fraction of lecithin, wherein the phosphatides of this fraction have a PE to PC ratio in the range of 2–5 and optionally
 c) 25–300 parts by weight of salt 10. An anti-spattering agent for use in edible fatty spreads to reduce spattering when the spread is used for frying, said agent consisting essentially of blown bean oil and a mixture of phosphatidyl choline and phosphatidyl ethanolamine with a phosphatidyl choline/ethanolamine ratio greater than 2.

11. An edible spread characterized by its anti-spattering properties when used for frying, said spread consisting essentially of water-in-oil emulsion having a fat content of 50–70% and, as an anti-spattering agent, an effective amount of thermally oxidized bean oil, a mixture of phosphatidyl choline (PC) and phosphatidyl ethanolamine (PE) in a PC/PE ratio greater than 2, and salt.

12. The spread of claim 11 wherein the anti-spattering agent comprises 0.05–2 wt. % blown bean oil, 0.3–1 wt. % of the PC/PE mixture and 0.25–3% salt.

* * * * *